United States Patent
Goble et al.

(10) Patent No.: US 10,550,972 B2
(45) Date of Patent: Feb. 4, 2020

(54) MECHANICAL FITTING FOR PLASTIC PIPE

(71) Applicant: R.W. LYALL COMPANY, INC., Corona, CA (US)

(72) Inventors: Gregory Harlan Goble, Lake Forest, CA (US); Christopher Michael Hoang, Laguna Hills, CA (US)

(73) Assignee: R.W. LYALL COMPANY, INC., Corona, CA (US)

( * ) Notice: Subject to any disclaimer, the term of this patent is extended or adjusted under 35 U.S.C. 154(b) by 518 days.

(21) Appl. No.: 14/881,314

(22) Filed: Oct. 13, 2015

(65) Prior Publication Data

US 2017/0102102 A1 Apr. 13, 2017

(51) Int. Cl.
*F16L 21/08* (2006.01)
*F16L 21/02* (2006.01)
*F16L 21/00* (2006.01)
*F16L 37/092* (2006.01)

(52) U.S. Cl.
CPC .............. *F16L 21/08* (2013.01); *F16L 21/007* (2013.01); *F16L 21/02* (2013.01); *F16L 37/0925* (2013.01)

(58) Field of Classification Search
CPC ......... F16L 21/08; F16L 21/007; F16L 21/02; F16L 37/0925; F16L 31/00; F16L 47/12
USPC .......................... 285/104, 323, 342, 370, 398
See application file for complete search history.

(56) References Cited

U.S. PATENT DOCUMENTS

| | | | |
|---|---|---|---|
| 770,584 A | | 9/1904 | Hubbard |
| 3,614,137 A | * | 10/1971 | Jacobson |
| 4,083,586 A | | 4/1978 | Helm |
| 4,282,175 A | * | 8/1981 | Volgstadt ............ F16L 37/0925 |
| | | | 285/104 X |
| 4,775,171 A | * | 10/1988 | Marshall |
| 5,076,614 A | | 12/1991 | Yokomatsu et al. |
| 5,150,924 A | | 9/1992 | Yokomatsu et al. |
| 6,065,779 A | | 5/2000 | Moner et al. |
| 6,142,538 A | | 11/2000 | Volgstadt et al. |
| 6,412,538 B1 | | 7/2002 | Welfonder |
| 6,635,972 B1 | | 10/2003 | Barthel et al. |
| 6,851,728 B2 | | 2/2005 | Minami |
| 8,056,937 B2 | | 11/2011 | Guest |
| 8,789,853 B2 | | 7/2014 | Gershkovich et al. |
| 2003/0038481 A1 | * | 2/2003 | Viegener ................... 285/104 X |
| 2014/0197632 A1 | * | 7/2014 | Hennemann |

* cited by examiner

*Primary Examiner* — Zachary T Dragicevich (57) ABSTRACT

Spigot device including a spigot formed with exterior gripping teeth and sleeve device to telescope over the spigot. The sleeve device is formed with a radially inwardly opening, distally contracting conical bearing surface which mounts a radially inwardly contractible gripper ring device captive therein, and constructed to be driven radially inwardly by the bearing surface as the sleeve is drawn proximally on the spigot to grip a plastic pipe trapped in the annulus between the sleeve and spigot. The method includes selecting a sleeve device to fit over a spigot and an interfitting retainer collar with an interior distally extending and radially and inwardly sloped bearing surface defining a gripper ring cavity. Selecting a gripper ring device which is contractible radially inwardly and inserting it in the cavity and retaining the gripper ring device to cooperate in forming an annulus for receipt of a plastic pipe and causing the gripper ring device to grip the pipe.

20 Claims, 4 Drawing Sheets

MECHANICAL FITTING FOR PLASTIC PIPE

BACKGROUND OF THE INVENTION

Field of the Invention

The present invention relates to fittings for connecting to one or more plastic pipes typically used in the transmission of natural gas.

Description of the Prior Art

Plastic pipe, such as polyethylene, has become a popular conduit for transmission of natural gas. As use of such polypropylene pipe has become more and more popular in the industry leading to wide spread use, the demands of industrial, local and national oversight agencies have placed the integrity and management of natural gas under increased scrutiny demanding robust and reliable connections.

Over the years, numerous different procedures have been proposed in industry for connecting plastic pipe including fusion of pipes to form a gas tight seal and, alternatively, use of telescopically inter-fitting parts having dynamic seals, such as O-rings, interposed therebetween.

Other efforts have led to proposal of a polyester fitting formed with a tubular body and having coupling members bonded to opposite ends thereof with one such coupling member being formed with interior seals which seal dynamically with a tube received telescopically within the body. A device of this type is shown in U.S. Pat. No. 4,023,831. Devices of this type, however, the suffer shortcoming that the seals are exposed directly to the telescopical tube and any foreign material, dirt or debris carried on such tubes and, more importantly, the overall sealing and axial pull characteristics would not typically meet the current demands of industry.

A dynamic plastic pipe coupling shown in U.S. Pat. No. 4,386,796, issued to Applicant, on the application of the late Robert W. Lyall and Donald C. Hill has met with considerable commercial success for use in underground repair work but, again, incorporates dynamic seals that require fusion and some high degree of technical competency for proper installation.

Metal to plastic connections have been proposed which include metal inserts to be inserted into the end of a plastic pipe and over which a metal finishing sleeve might be drawn to compress the wall of the pipe radially inwardly in grooves formed on the exterior of the insert. A device of this type is shown in U.S. Pat. No. 4,293,147. Other devices have been proposed which incorporate double ended spigots having a profile that is somewhat saw-toothed for insertion into a thermal-plastic pipe and over which a shrinkable sleeve to be shrunk onto the pipe to compress it against the grooves formed in the spigot. A device of this type is shown in Australian Patent No. 220,055.

Other devices have been proposed for coupling reinforced hoses to a fitting and featuring a ferrule formed with a conical interior into which an angular wedge may be fitted. The wedge has radially inwardly directed teeth to be driven into the wall of the hose to deform it into grooves in an interior nipple. A device of this type is shown in U.S. Pat. No. 4,775,171 to Marshall. Devices of this type, while effective for assembly to connect with a reinforced hose, suffer the shortcoming that they require tedious work in assembling the components at the work site and do not form the high integrity seal required for the gas industry.

It has also been proposed to provide polyethylene pipe transition fittings including tubular inserts for inserting in the extremity of a polyethylene pipe and a collar which is toothed on its interior to be received over the pipe extremity to sandwich the pipe wall between the insert and collar.

In other industries, for the transmission of air or water various different fittings have been proposed such as plug-in or push-in pipe fittings. One such device incorporates a tubular insert formed along its length with outwardly opening glands for receiving sealers to engage the interior of a plastic pipe and formed at the distal end with exterior teeth. A fitting body is received over one end of the insert and the opposite end inserted in the pipe. A conically shaped cylindrical nut is received concentrically over the body and is formed with an interior conical section which will engage an expandable annular grip ring formed interiorly with teeth for engaging the exterior surface of the pipe. The device is applied to a pipe by inserting the insert in the body and then passing the grip ring over the insert and thereafter passing the nut over the grip ring to cause a plurality of axially projecting fingers to snap over a flange to hold the nut on the body, apparently intended to contract the gripper ring radially inwardly by engaging it with the pipe extremity and drawing the pipe distally relative to the nut. Such devices, while satisfactory for some applications, would not be acceptable for use in connecting pipes for transmission of natural gas. The assembly thereof in the field would also be tedious and require considerable technical capability and would not have sufficient sealing capability to prevent the escape of explosive gasses and the like.

SUMMARY OF THE INVENTION

The present invention includes a sleeve device to be telescoped over a spigot and formed with a radially inwardly opening distally inwardly angled conical bearing surface forming a gripping ring cavity. The gripper rings are retained n the sleeve to cooperate with the spigot to form an annulus for receipt of a plastic pipe. As the spigot device pushes the gripper ring device distally relative to the sleeve, the bearing surface drives the gripper ring device radially inwardly to grip the wall of the pipe.

In one embodiment, the present invention includes a spigot device formed with a distal spigot for insertion into the extremity of a plastic pipe and formed with a proximal flange defining a distally facing pusher shoulder. A sleeve assembly includes a sleeve device constructed to be received over the spigot to be shifted proximally to a sealing position and formed with a proximal, cylindrically shaped compression collar cavity joined with a distally extending, radially inwardly angled conical bearing surface defining a gripper ring chamber. The sleeve assembly also includes a radially inwardly contractible gripper ring device retained in the gripper ring chamber, biased outwardly against the bearing surface and constructed to, when received over the spigot, cooperate with the spigot to form an annulus to receive the wall of the pipe and, further, constructed so that when shifted proximally relative to the gripper ring chamber, cause such gripper ring device to contract radially into a gripping position entering the annulus. A compression collar is received in the compression cavity and formed on the proximal end to abut the pusher shoulder and on the distal end to engage the gripper ring device. The bearing surface, compression collar and pusher shoulder are so arranged and constructed that, when the sleeve assembly is introduced over the spigot and shifted proximally thereon toward the sealing position, the proximal end of the compression collar will engage the pusher shoulder and, continued travel proximally of the sleeve assembly, will cause the collar to push the gripper ring device distally relative to the bearing surface to compress the gripper device radially inwardly to the gripping position. A lock device such as a split ring is provided to interact between the sleeve and spigot device to lock the sleeve in the sealing position relative to the spigot.

The method of making the fitting of the present invention includes selecting a sleeve device with a barrel defining the gripper ring cavity, inserting the ring device in the cavity and retaining it in place for receipt of the pipe.

DETAILED DESCRIPTION OF THE PREFERRED EMBODIMENTS

Modern day transmission of natural gas conveniently and typically employs plastic pipe such as polyethylene and the current demands for integrity of a connection and durability place unique demands on industry to provide solutions heretofore unavailable. Prior to the present invention, those working in the trade were faced with the dilemma of either adopting a method of connecting pipe members involving techniques demanding specialized skill and tooling or sometimes even compromising on the integrity of the seal and/or axial strength of the resultant connection. Thus, we have developed a new hybrid approach to reduce the manipulations and tooling necessary to install a fitting while insuring long term integrity.

Figure 2:
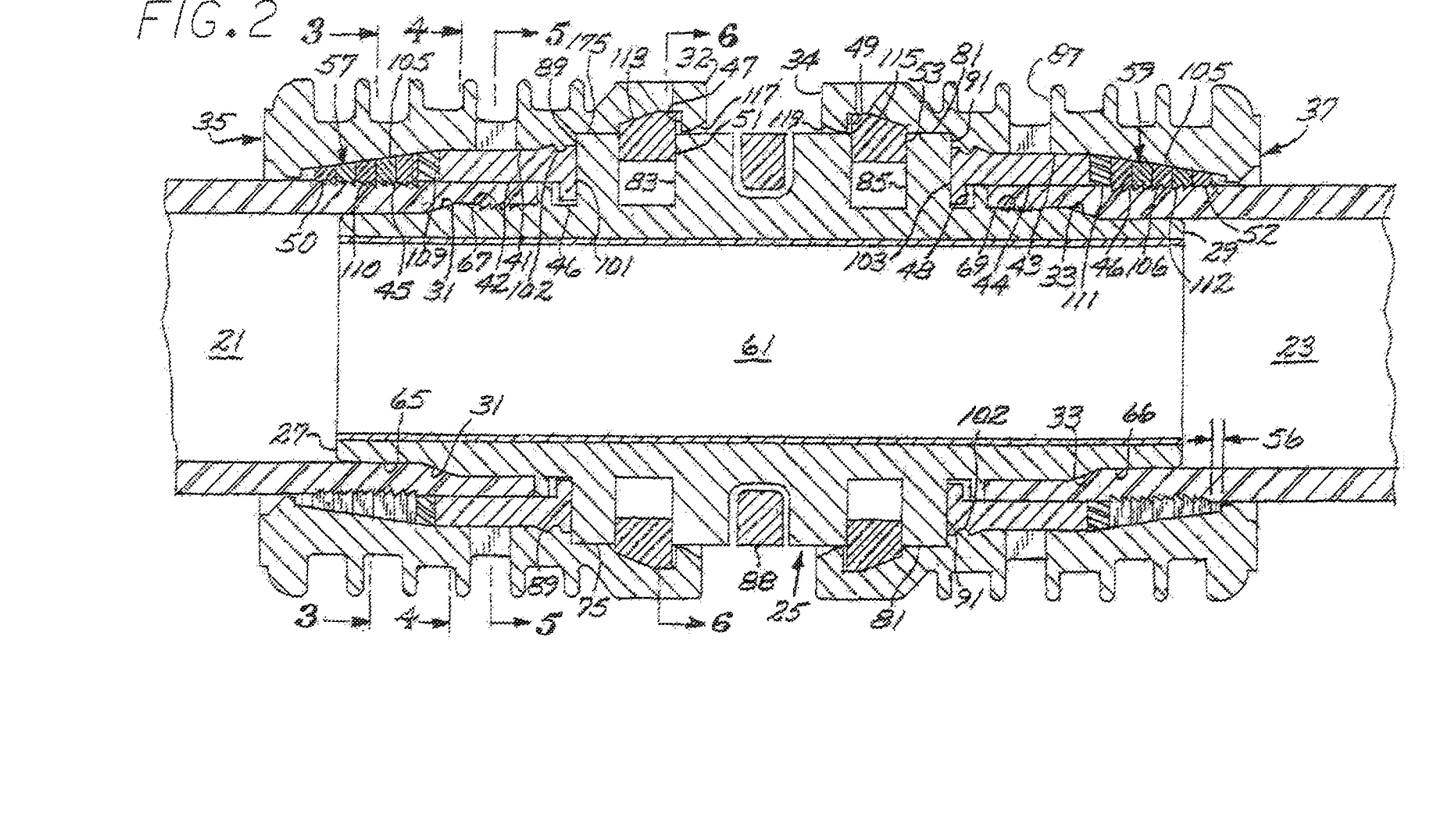
FIG. 2 is a longitudinal sectional view, in enlarged scale, taken along the lines 2-2 of FIG. 1.

To this end, we have devised a mechanical fitting for connecting plastic pipes 21 and 23 together (FIG. 2). This device includes, generally, a spigot device 25 formed with oppositely projecting spigots 27 and 29 which may include respective exterior expanders 31 and 33. Sleeve assemblies, generally designated 35 and 37, are constructed to be fitted over the respective spigots 27 and 29 and are formed with respective annular radially inwardly opening collar chambers 41 and 43 and extend distally to form radially inwardly tapered conical bearing surfaces 45 and 47 which define gripper ring cavities.

In one preferred embodiment, the proximal ends of the sleeve assemblies 35 and 37 are formed with inwardly opening annular glands 47 and 49 which receive respective split retainer ring devices 51 and 53 that engage with the spigot device 25 to lock the respective sleeves in their sealing positions. It will be appreciated that the sleeve assemblies 35 and 37 will be assembled by inserting gripping ring devices 57 and 59 which are radially expanded against the respective bearing surfaces 45 and 46 and contractible to a reduces inner diameter. Split, cylindrical collars 42 and 44 are inserted in the collar chambers to be pressed axially against the gripper ring devices to retain them in place. Thus, the sleeves 35 and 37 may be telescoped proximally on the extremities of the respective spigots 27 and 29 to form respective annuli to receive the proximal extremities of the pipes 21 and 23. Respective extremities of the pipes will be expanded by the respective expanders 31 and 33 to engage the outer surfaces with the radial interior of the respective gripper ring devices 57 and 59. The respective compression collars 42 and 44 also serve as axial spacers which, as the sleeves are drawn proximally toward one another, engage the spigot device thus stopping proximal movement of the respective gripper ring devices 57 and 59 relative to the sleeve so that further proximal travel of the sleeve causes the respective bearing surfaces 45 and 46 to drive the gripper ring devices radially inwardly to engage with the exterior wall of the respective pipes 21 and 23 to thereby take advantage of the viscoelastic properties of the pipe to positively lock the pipe extremities in place and positively seal against leakage.

Referring to the drawings in greater detail, it will be appreciated by those skilled in the art that spigot device 25 and sleeve assemblies may be constructed of any desirable material but, for the purposes of the illustrations we have selected a long chain polyamide which has proven to work satisfactorily. The sleeve assemblies 35 and 37 will be engaged by the forks 86 of conventional compression tools for applying the mechanical advantage to compress them toward one another to the point where the respective glands 47 and 49 register with the respective retainer rings 51 and 53 allowing the retainer rings to snap back outwardly in their expanded position to lock the sleeves in place.

In the preferred embodiment, we have elected to include a metallic tubular insert 61 in the spigot body 25 to cooperate in maintaining walls thereof distended. In this embodiment we formed the distal extremities of the respective spigots 27 and 29 with respective cylindrical introducer lands 65 and 66 leading to the conical radially and proximally outwardly expanding, conical expanders 31 and 33 which then lead proximally to respective tubular sections incorporating respective sets of exterior teeth 67 and 69 for penetrating the interior surface of the compressed pipe wall for enhancing frictional connection therewith, as well as the sealing function thereof. The reader will appreciate that teeth 67 and 69 provide a high friction engagement with the interior of the pipe and can take many different forms, such as grooves, serrations, pin points and the like. The central portion of the spigot device is configured exteriorly with a hub arrangement that includes a plurality of flanges which cooperate to form respective outwardly opening retainer ring glands 83 and 85 and also a radially outwardly opening groove 87 for convenient receipt of the fork 88 and a compression tool if desired.

The spigot body is formed medially with radially outwardly projecting annular flanges 75 and 81 to define distally facing annular abutment shoulders 89 and 91 to be abutted by the proximal ends of the respective compression collars.

As will be further appreciated by the reader, it is important to the integrity of the overall fitting that the spigot device and sleeve devices be constructed and assembled in such a manner that they are convenient to use and readily installed in the field and that they lend themselves to a connection which is of high integrity to provide a seal sufficiently reliable to pass local, state and national codes and will provide safety at the location of the connection.

In this regard, the sleeve assemblies 35 and 37 are self-contained and are formed with cylindrical and conical interior surfaces defining the respective collar chambers 41 and 43 and gripper cavities 79 and 72 defined by the bearing surface 45 and 46. It will be appreciated that the collars 42 and 44 must be retained in the respective cavities as by being exposed radially outwardly to frictionally engage the wall of the chamber.

Figure 1:
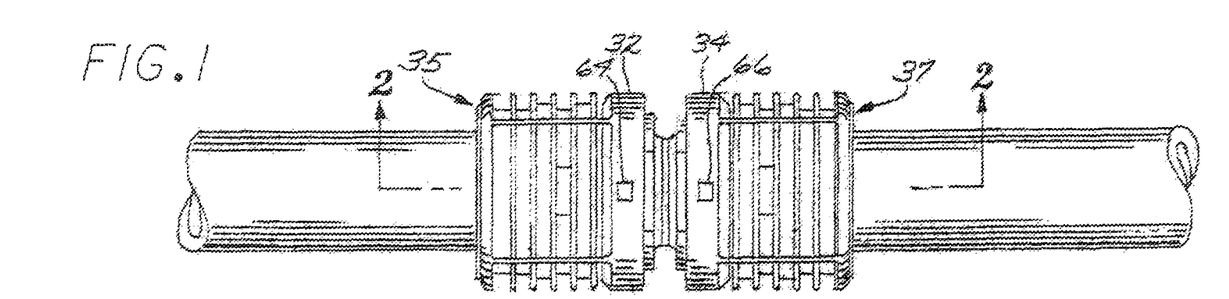
FIG. 1 is a longitudinal view of a fitting device incorporating the present invention.

Referring to FIG. 1, the walls of the sleeve assemblies 35 and 37 are formed at their proximal extremities with respective through windows 44 and 46 disposed in radial alignment with one or more of the internal components, such as the respective retainer rings 51 and 53 so the workman can observe such rings latching in their retaining positions to be assured the sleeves are in their respective sealing positions.

In the preferred embodiment, the sleeves are further formed at the proximal extremities of the collar chambers 43 with annular ribs 102 for engaging radially outwardly opening grooves 104 in the proximal extremities of the collars 42 and 44. Conveniently, the collars are constructed of half shell segments configured such that, when received in combination in the collar chamber, they will be biased radially outwardly to maintain the retaining ribs 102 in the grooves 104. As will be appreciated by the reader, the collars may take many different forms and may be maintained in the sleeves by any one of a number of retention devices, such as, for instance, a resilient gasket on the exterior of the collar, nesting in a proximal radial recess on the sleeve or even an interference high friction fit in the sleeve. The collars themselves need only serve to compress the gripper devices distally and prevent travel thereof proximally relative to the sleeve and may be in the form of a cage or merely a ring with axial fingers to push distally on the respective gaskets.

The distal ends of the respective sleeves are formed with radially in-turned retainer lips 50 and 52 spaced a distance 56 from the respective smallest ring 105 to limit travel of the gripper ring device (FIG. 1).

Figure 3:
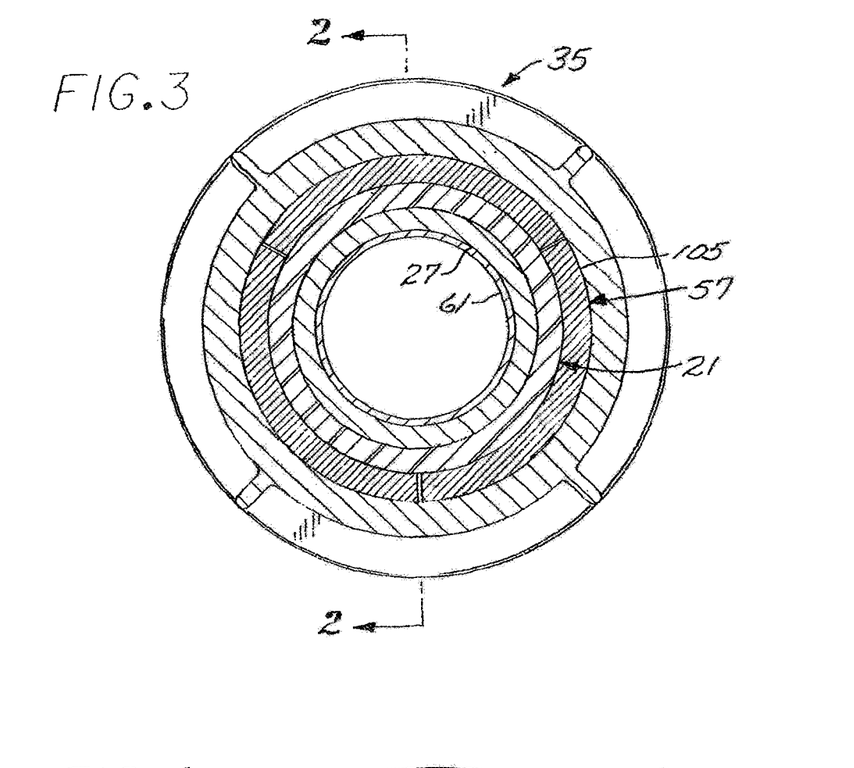
FIGS. 3, 4, 5 and 6 are transverse sectional views taken along the respective lines 3-3, 4-4, 5-5, and 6-6 of FIG. 2.
Figure 4:
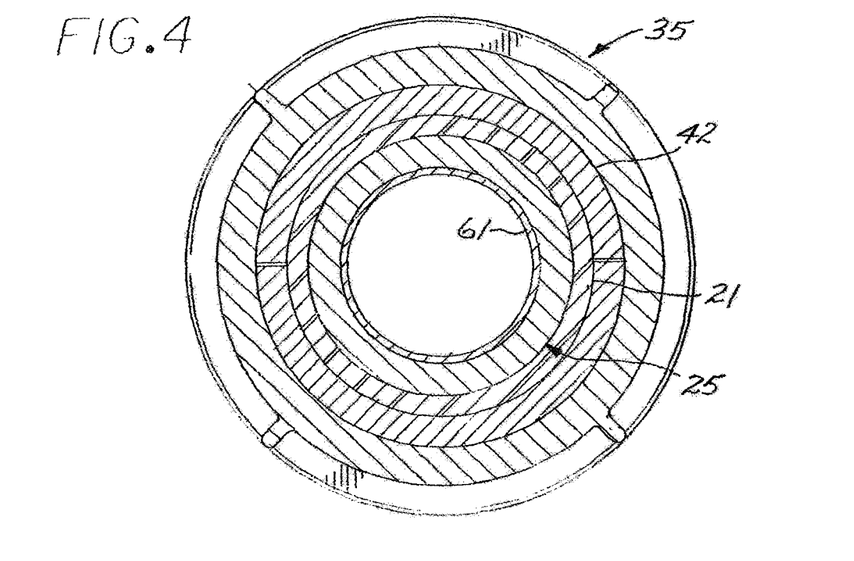
Figure 5:
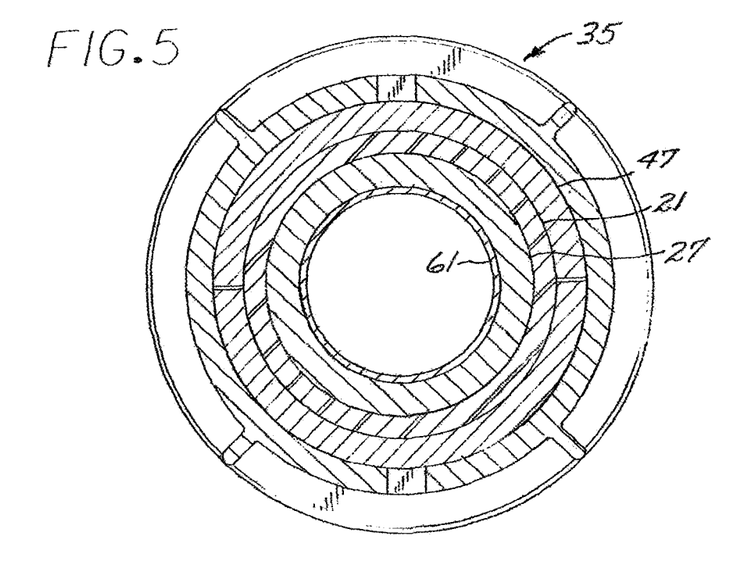

The gripping ring devices 57 and 59 are preferably made up of a stack of, for instance, three annular segments per ring 105 (FIG. 3) referred to herein as split rings. In referring to the term split ring for the various elements such as the collars, gripping rings and locking rings, we intend to describe a resilient, flexible ring-shaped item which may be in the form of a continuous hoop having a gap at one side to accommodate radial expansion and contraction and/or resilient ring segments which may be made up of annular segments of, for instance, 180° or 120° of a circle, it only being important that the split rings have an accommodation for expanding and contracting radially. The rings are formed on their inside diameters with cylindrical surfaces incorporating the teeth 110 & 112 and are formed with conical outer surfaces to complement the slope of the respective bearing surfaces 45 and 46. The rings 105 are stacked axially and configured with progressively greater radial thicknesses as one progresses in the proximal direction to thus cooperate in forming a combined longitudinal profile to correspond in exterior profile with the slope of the conical bearing surfaces and to form a combined cylindrical interior toothed surface.

As noted, the segments of respective most distal rings 105 are constructed with a relaxed combined diameter for the combination to nest in the respective conical bearing surfaces at a distance 56 from the respective lips 50 and 52 to allow space for the stack of rings to be shifted distally on the ring cavities to be rotated radially and inwardly penetrating the outer surfaces of the respective pipes 21 and 23.

The proximal extremities of the sleeves are formed with respective annular flanges 32 and 34 cooperating to form the respective radially inwardly opening glands 47 and 49. The flanges 32 and 34 are formed on their respective proximal sides with radially, inwardly and distally angled annular cam surfaces 117 and 119 designed to engage the respective lock rings. Referring to FIGS. 1 and 2, in the preferred embodiment the sleeve devices are formed with annular reinforcing ribs 118 to contribute to the strength of the respective sleeve bodies.

The respective collars 42 and 44 are in the form of elongated semi-cylindrical body shells and are configured at their proximal ends radially inwardly projecting flanges 46 and 48 (FIG. 2) presenting proximally facing abutment surfaces 101 and 103 for abutting against the respective pusher shoulder surfaces 89 and 91. For the purposes of this invention, the collars need only serve to be locked in position in the respective sleeves to maintain the gripping ring devices compressed against the respective bearing surfaces to be constructed slightly radially inwardly and held frictionally in place.

The respective gripper ring devices 57 and 59 are in the form of a series of individual split rings 105 each formed by three arcuate segments (FIG. 3) of the same inside diameter but of progressively greater radial thickness in the proximal direction to complement the shape of the respective bearing surfaces defining gripper ring chambers. The respective diameters of such rings 105 are conically shaped to complement the conical shape of the bearing surfaces 45 and 46. Interposed between the respective proximal rings 105 and the distal end of the respective collars are elastomeric, resilient cushioning gaskets 109 and 111 which provide for some resilient compression to accommodate travel of the respective sleeves relative to the spigot device and maintain a compressive force on such rings.

Figure 6:
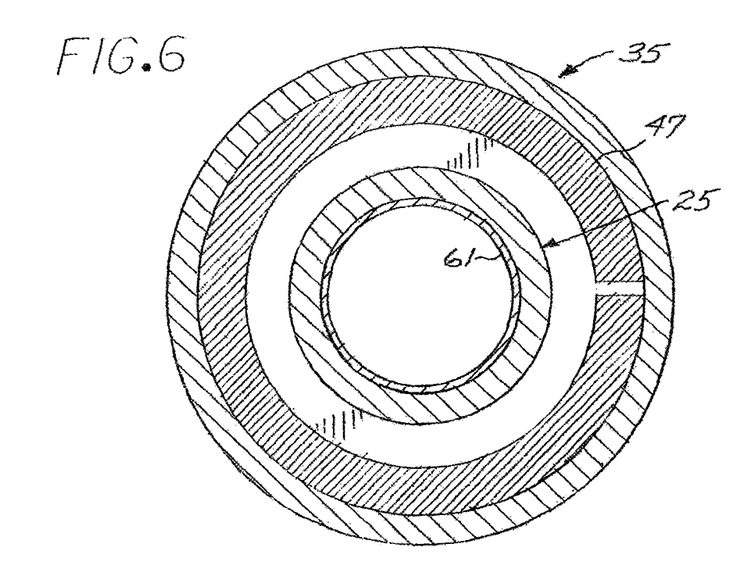

Referring to FIG. 6, the lock rings 51 and 53 are in the form of resilient split rings formed on their radially exterior surfaces with respective radially inwardly and distally inwardly angled cam surfaces 113 and 115 (FIG. 2) configured to be engaged by a complementary radially, inwardly facing cam surfaces 117 and 119 formed on the radial inner extremity of the respective flanges defining the proximal sides of the respective glands 47 and 49.

In operation, it will be appreciated that the spigot device 25 and the sleeve devices 35 and 37 will be fabricated at a fabrication plant and boxed and shipped to a repair company to be available to the workman travelling to the repair or construction site. Fabrication may conveniently be made by machining or forming the bodies on the spigot device 25 and sleeve devices as shown. The sleeves may be set erect with the proximal ends opening inwardly. The respective segments of the rings 105 making up the gripper ring devices 57 and 59 may be dropped into the sleeves from the top ends, commencing with the smallest diameter ring to be assembled in the respective ring cavities 47 and 49. As will be appreciated by one skilled in the art, the ring segments are so sized that the distal, smaller ring will nest against the respective bearing surface and axial distance 56 from the respective retainer lips 50 and 52 to leave room the be driven further in the distal direction toward the smaller end of the ring chamber to cause the respective bearing surfaces to contract such rings radially inwardly. The gasket segments may then be dropped into the sleeve stacked on the ring segments and the half cylinder segments of the respective collars 42 and 44 then dropped into the respective sleeves and pressed distally to compress the respective gaskets 109 and 111 slightly in the axial direction until the respective grooves 104 register with the ribs 102 to lock the collars in place with the ring devices under compression to be held in place. It will be appreciated that the collar segments are so configured that they will cooperate to maintain such segments wedged radially outwardly to maintain the ribs 102 engaged with the grooves 102 to lock the collars in position with the rings 105 and gasket 111 stacked in place compressed toward the small end of the ring cavity to the extent dictated by the relaxed radially outer periphery of the relaxed rings leaving the spaces 56 between the distal most ring and respective lips 50 and 52.

Then, when the workman is prepared to make a joint between plastic pipes 21 and 23, a pair of sleeve devices and spigot device of the appropriate size will be retrieved from inventory and taken to the job site. The pipes themselves will be cut to square ends and the sleeve assemblies 35 and 37 slid onto the pipes 21 and 23 and the spigot device 21 positioned between the pipe ends so the sleeves may be advanced onto the respective spigots 27 and 29 to cooperate in forming respective annuli for receipt of the walls of the pipes. The pipes 21 and 23 may then be advanced the respective annuli to be expanded and engage the spigot teeth 67 and 69 to a first position on the radial inner surfaces of the respective pipes. Continued advancement of the sleeves onto the spigot member will thus draw the pipes 21 and 23 toward one another and into the annulus. To complete the operation, the forks 86 and 88 a conventional compression tool will be engaged between the respective sleeves and spigot device or with the sleeves themselves. The compression tool may then be actuated to draw the sleeves proximally thus drawing the gripper devices proximally to draw the pipes in the proximal directions to drive the extremities thereof further over the expanders 31 and 33 until the ends of the pipes abut against the distal sides of the shoulder flanges 46 and 48. It will be appreciated that the compression tool has sufficient mechanical advantage to drive the respective pipes 21 and 23 proximally into the narrow space between the respective teeth 104 and 106 and the interior of the respective collars 42 and 44 thereby flowing the walls of the respective tubes to a thinner configuration and enhancing gripping with the teeth 104 and 106.

To further enhance sealing, as the sleeve assemblies 35 and 37 are drawn proximally, the respective collars 42 and 44 will likewise be drawn proximally causing the proximal ends 101 and 103 of such collars to engage the respective shoulder 89 and 91 to stop travel of such collars relative to the sleeves. It will be appreciated that the continued proximal travel of the sleeves relative to the spigot device will cause the respective distal ends of the collars to push against the respective resilient gaskets 109 and 111 thereby stopping proximal travel of stacks of gripper rings 105 causing the respective bearing surfaces 45 and 47 to ride on the radially outer extremities of such rings to drive the segments of such rings even further radially inwardly biting the teeth 110 and 112 into the outside of the walls of the respective tubes 21 and 23. As the proximal ends of the respective sleeves continue proximal travel, the cam surfaces 117 and 119 will engage the respective cam surfaces 113 and 115 and further travel will cause the respective lock rings 51 and 53 to be compressed radially inwardly into the glands 83 and 85 to the point where the flanges will pass proximally thereover to, as they clear the rings, free such rings to snap radially outwardly pushing the outer portions of the respective segments radially outwardly to project into the respective glands 47 and 49 to thus lock the respective sleeves in their sealing positions.

The construction of the present invention provides for the workman to apply high compressive pressures to the fitting to take advantage of the viseoelastic characteristics of the pipe itself and high pressure engagement of the respective gripping teeth with the wall surfaces of the pipe to thereby provide for high pressure compression of the pipe and high integrity sealing thereof.

The resultant construction will thus provide for the respective individual segments of the narrow rings 105 to be driven radially inwardly to a degree dictated by the resistance of the respective bodies of the tubes 21 and 23 to provide a firm and high integrity frictional contact and a circuitous leak-resistant path which provides for a hermetic seal on the exterior of the pipes while the teeth 67 and 69 biting into the interior surface of the walls of the respective pipes also provide a positive hermetic seal on the interior of the pipes. It will be appreciated that when the fitting is then buried subterranean with the pipes, the fitting will be subjected to various forces such as may be dictated by thermoexpansion and contraction and/or shifting of the ground as by normal geophysical activity and sometimes water penetration or earth movement thus applying forces to the pipes 21 and 23 which may be experienced in the fitting as axial forces, sometimes tending to draw the pipes distally. As will be appreciated by the reader, any such tendency to draw the pipes distally will tend to draw the gripping rings 105 distally thereby riding the exterior surfaces thereof distally on the radially inwardly tapered contour of the respective bearing surface thus driving the gripping rings further radially inwardly to thereby enhance the grip on the respective pipes. In fact, the testing of the physical embodiments of the present invention has demonstrated that the connection afforded by the subject invention creates a connection which is stronger than the parent pipe itself.

Figure 7:
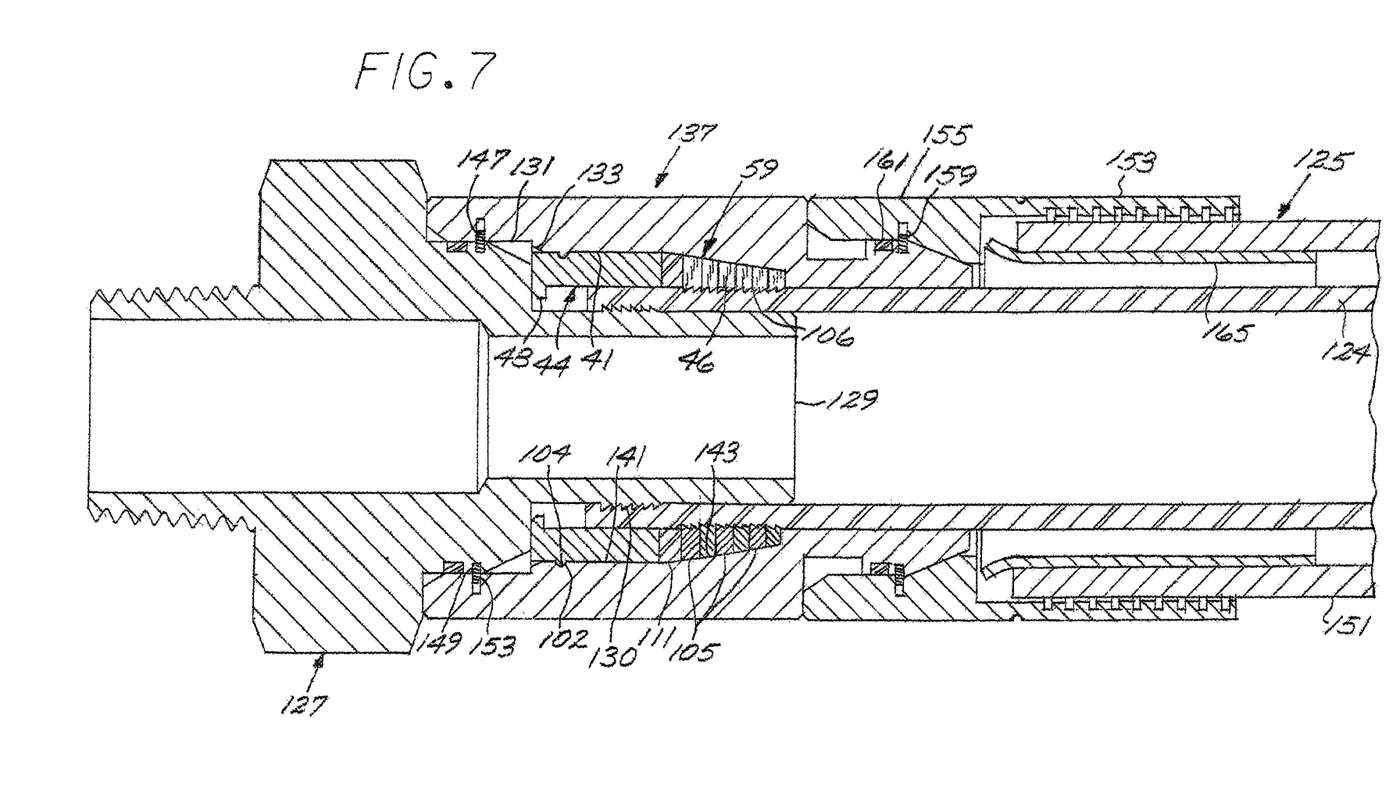
FIG. 7 is a longitudinal sectional view of a second embodiment of the fitting device of the present invention.

Referring to the embodiment shown in FIG. 7, the invention depicted therein is substantially the same as that shown in FIGS. 1 and 2 except that it is intended for connecting a plastic pipe 121 with a riser fitting, generally designated 125, to join with a metallic riser which rises above ground to connect with a meter or the like. The fitting 127 is formed medially with a hex head 128 and with a distally projecting annular flange 131 formed medially with a distally facing pusher shoulder 133. The fitting is further formed with a distally projecting spigot 129 configured with extended gripper teeth 130.

A sleeve device, generally designated 137, is received telescopically over the spigot 129 and is formed interiorly with a cylindrical collar chamber 141 and distally extending inwardly tapered bearing surface 143 forming a gripping ring cavity.

As will be appreciated by those skilled in the art, this configuration provides for high compression forces to be applied which will particularly engage the walls of the pipes from both the inside and outside and will tightly compress such walls to provide a positive hermetic seal while providing a joint serving to resist high axial forces applied thereto without separating. This can be an important feature for many applications, as where the ground shifts or the pipe is disrupted applying axial loads thereto which could cause separation of the buried joint requiring expensive and time consuming repair work, not to mention the danger associated with escaping natural gas.

The proximal extremity of the sleeve 137 is formed with an inwardly opening annular gland 147 aligned with a corresponding gland 149 in the flange 131 so that, when the sleeve is shifted into position relative to the spigot 129 a retainer ring 153 will snap radially inwardly into retaining position.

The interior of the sleeve 137 is formed with a cylindrical bore defining a collar chamber 41 and a tapered conical bearing surface 46. The collar 44 is disposed in the collar chamber and a plurality of gripper rings 105 are received in the gripping ring chamber similar to the configuration shown in FIG. 1. A cushioning gasket 111 is interposed between the stack of rings 105 and the distal end of the collar 41.

As known in the art, the riser includes a flex tube 151 received in a skirt 153 formed by a flex swivel 155. Received between the flex swivel and extension of the sleeve 137 is a split ring fastener clip 159 and a weather seal 161. A tubular flex stiffener 165 is received in the proximal extremity of the flex tube 151. Assembly of the self-contained sleeve device 137 shown in FIG. 7 will be the same as that for the sleeve device shown in FIG. 1, ready for transport to the field for connection of a riser 125.

Similar to the description above, when a connection is to be made for a riser, the plastic pipe 124 is cut off square at its end and can be inserted in the annulus formed between the interior diameters of the collar 44 and the gripping ring device 46 and the compression device connected between such sleeve and the flex 127 to draw the sleeve proximally on the spigot 129. As described above, as the sleeve is drawn proximally, the bearing surface 46 will draw the stack of gripper rings 105 proximally until the gasket 111 engages the distal end of the collar 44 thereby stopping further travel of such rings relative to the spigot 129. Further proximal travel of the sleeve 137 on such spigot will tend to cause the bearing surface 46 to drive the respective segments of the rings 105 radially inwardly to engage the respective teeth 106 more firmly with the exterior surface of the pipe 124 thereby enhancing the sealing function. Should axial force be applied to the pipe 124 tending to pull from the annulus drawing the rings 105 distally, causing the bearing surface 46 to drive such rings radially inwardly thus enhancing the gripping effect to more positively resist axial separation.

In the preferred embodiment we prefer that both the sleeve body and spigot body be made of plated and/or coated low carbon steel. In both embodiments the internal components of the completion sleeve are the same. The gripper rings and collar may be made from a transparent amorphous polyamide material that provides strength equal to or greater than the body of the sleeve body.

From the foregoing it will be apparent that the connection device of the present invention and method of manufacture provides an economical and reliable connection for a natural gas joinder. The construction of the sleeve device to be self-contained provides for convenient application in the field with relative modest skill by the workman.

Although the present invention has been described in detail with regard to the preferred embodiments and drawings thereof, it should be apparent to those of ordinary skill in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention.

We claim:

1. A fitting device for connecting in an extremity of a plastic pipe and comprising:
    a spigot device including a distal spigot for inserting in the extremity of the plastic pipe, formed proximally with a radially outwardly opening gland and including a proximal flange defining a distally facing pusher shoulder;
    a self-contained sleeve assembly including a sleeve device constructed to be received on the spigot device and shifted proximally to a sealing position and formed with a radially inwardly opening gland oriented to be, when the sleeve assembly is in the sealing position, aligned with the outwardly opening gland and formed with a proximal cylindrically shaped compression collar cavity joined with a distally extending radially, inwardly angled conical bearing surface defining a ring chamber;
    a radially inwardly contractible gripper ring device received in the ring chamber and constructed to, when received over the spigot, cooperate with the spigot to form an annulus complimenting the shape of the wall of the plastic pipe and constructed to, when the bearing surface is shifted proximally relative to the gripper ring device toward a sealing position, cause the gripper device to contract radially inwardly to a penetrating position projecting into the annulus, a compression collar received in the compression cavity and formed with a proximal end to abut the pusher shoulder, a distal end to engage the gripper ring device and further constructed to, when dropped in a selected position in the cavity, compress the gripper ring in the chamber to hold the gripper device in the chamber;
    a retainer for retaining the compression collar in the selected position and including a resilient retainer ring constructed to be interposed in the glands;
    the bearing surface, compression collar and pusher shoulder being so constructed and arranged that, when the sleeve assembly is introduced over the spigot, and shifted proximally thereon toward the sealing position the proximal end of the compression collar will engage the pusher shoulder and, continued travel proximally of the sleeve assembly will cause the collar to push the gripper device distally relative to the bearing surface to compress the gripper device radially inwardly to the penetrating position; and
    a lock device interposed between the spigot device and sleeve assembly to lock the sleeve assembly in the sealing position.

2. The fitting device of claim 1 wherein:
the gripper ring device includes a split ring device.

3. The fitting device of claim 1 wherein:
the gripper ring device includes a plurality of split ring devices.

4. The fitting device of claim 1 wherein:
the gripper device is formed on its radially inner surface with a high friction elements.

5. The fitting device of claim 1 wherein:
the gripper device is formed on its radially inner surface with a plurality of teeth.

6. The fitting device of claim 1 wherein:
the spigot device includes a reinforcing tube inserted therein.

7. The fitting device of claim 1 wherein:
the spigot is formed with a radially outwardly and distally extending expander.

8. The fitting device of claim 1 that includes:
a resilient gasket interposed between the gripper ring device and compression collar.

9. The fitting device of claim 1 wherein:
the ring device includes a ring configured to be retained in the ring chamber and is formed with a distally and inwardly sloped first cam surface;
the retainer includes a contractible retainer ring; and
the sleeve device is formed with a retainer flange incorporating a second cam surface to, when the sleeve device is moved proximally into its sealing position, engage the first cam surface to, as the sleeve device continues proximally, contract the retainer ring radially inwardly so the retainer flange clears the retainer ring to free the retainer ring to snap radially outwardly to engage the inwardly opening gland.

10. The fitting device of claim 1 wherein:
the spigot device is formed with a radially outwardly projecting flange defining a distally facing pusher surface; and
the compression collar is formed with a proximal end abutment for abutting against the shoulder to stop proximal travel of the collar relative to the sleeve device.

11. The fitting device of claim 1 wherein:
the compression sleeve includes a connector for connecting to a natural gas riser.

12. The fitting device of claim 1 wherein:
the spigot device includes a radially outwardly opening peripheral groove for engagement by a compression tool.

13. The fitting device of claim 1 wherein:
the sleeve device includes a wall formed with a window for viewing of the spigot device.

14. The connector fitting device of claim 1 wherein:
the gripper ring device is constructed with a radially inwardly facing surface configured with teeth to engage the respective extremities.

15. The connector fitting device of claim 1 wherein:
the gripper ring device includes a plurality of split rings.

16. The connector fitting device of claim 1 wherein:
the spigot device is formed with radially outwardly opening grooves for receiving the working head of a compression tool for engagement to drive the sleeves proximally toward one another.

17. A fitting device for connecting to a plastic pipe and comprising:
a spigot device including a proximal, radially outwardly opening gland and including a distal spigot for inserting in the extremity of the pipe and formed with a proximal flange defining a distally facing pusher shoulder;
a self-contained sleeve assembly including a sleeve device constructed to be received on the spigot and shifted proximally to a sealing positon and formed with an inwardly opening gland oriented to be, when the sleeve assembly is in the sealing position, aligned with the outwardly opening gland and further formed with a proximal cylindrically shaped compression collar cavity joined with a distally extending radially, inwardly angled conical bearing surface defining a ring chamber;
a radially inwardly contractible gripper ring device received in the ring chamber and constructed to, when received over the spigot, cooperate with the spigot to form an annulus complimenting the shape of the wall of the pipe and being constructed to, when the bearing surface is shifted proximally relative to the gripper ring device toward a sealing position, cause the gripper device to contract radially inwardly to a penetrating position projecting into the annulus, a compression collar received in the compression cavity and formed with a proximal end to abut the pusher shoulder, a distal end to engage the gripper ring device and further constructed to, when dropped in a selection position in the cavity, compress the gripper ring device distally in the chamber to hold the gripper device in the chamber;
a split-resistant retainer ring interposed in the glands for selectively retaining the compression collar in the selected position; and
the bearing surface, compression collar and pusher shoulder being so constructed and arranged that, when the sleeve assembly is introduced over the spigot, and shifted proximally thereon toward the sealing position the proximal end of the compression collar will engage the pusher shoulder and, continued travel proximally of the sleeve assembly will cause the collar to push the gripper device distally relative to the bearing surface to compress the gripper device radially inwardly to the penetrating position.

18. A fitting device for connecting plastic pipes together and comprising:
a spigot device including a pair of oppositely disposed distal spigots for inserting in the respective extremities of the pipes and formed with respective expanders to expand the respective extremities;
a sleeve assembly including a pair of sleeve devices constructed to be received over the respective spigots and to be shifted proximally to respective sealing positions, the respective sleeve devices being formed with respective proximal cylindrical compression collar cavities joined with respective distally radially inwardly angled conical bearing surfaces defining respective gripper ring chambers;
the spigots and the respective sleeve devices are formed with respective annular glands opening radially toward one another and arranged to, when the sleeves are in the respective sealing positions, be aligned, and respective split lock rings received in the respective glands to, when the sleeves are in the respective sealing positions, engage between the glands to retain the sleeves on the spigot device; and
the sleeve assembly further including respective radially, inwardly contractible gripper ring devices received in the respective ring chambers to cooperate with the respective spigots to form respective annuli corresponding with the wall of the pipe extremities and constructed to, when pushed proximally to selected positions, engage the respective bearing surfaces with the respective gripper ring devices to contract the ring devices radially inwardly to respective penetrating positions penetrating the annulus, the assembly including respective compression collars received in the compression collar cavities and formed with respective proximal ends to abut the respective pusher shoulders and with distal ends constructed to, when the respective sleeves are shifted to the respective sealing positions, engage the gripper ring devices to drive the respective gripper devices distally relative to the respective bearing surfaces to compress the gripper ring devices radially inwardly to their respective gripping positions.

19. The connector fitting device of claim 18 wherein:
the gripper ring devices are formed with radially inwardly facing surfaces configured with high friction elements to engage the respective extremities.

20. A fitting device for connecting to a plastic pipe and comprising:
a spigot device including a distal spigot for inserting in the extremity of the pipe and formed with a proximal flange defining a distally facing pusher shoulder;
a self-contained sleeve assembly including a sleeve device constructed to be received on the spigot and shifted proximally to a sealing positon and formed with a proximal cylindrically shaped compression collar cavity joined with a distally extending radially, inwardly angled conical bearing surface defining a ring chamber;
a radially inwardly contractible gripper ring device received in the ring chamber and constructed to, when received over the spigot, cooperate with the spigot to form an annulus complimenting the shape of the wall of the pipe and being constructed to, when the bearing surface is shifted proximally relative to the gripper ring device toward a sealing position, cause the gripper device to contract radially inwardly to a penetrating position projecting into the annulus, a compression collar received in the compression cavity and formed with a proximal end to abut the pusher shoulder, a distal end to engage the gripper ring device and further constructed to, when dropped in a selected position in the cavity, compress the gripper ring device distally in the chamber to hold the gripper device in the chamber;

a retainer for retaining the compression collar in the selected position and including a contractible retainer ring;

the bearing surface, compression collar and pusher shoulder being so constructed and arranged that, when the sleeve assembly is introduced over the spigot, and shifted proximally thereon toward the sealing position the proximal end of the compression collar will engage the pusher shoulder and, continued travel proximally of the sleeve assembly will cause the collar to push the gripper device distally relative to the bearing surface to compress the gripper device radially inwardly to the penetrating position;

a lock device interposed between the spigot device and sleeve assembly to lock the sleeve assembly in the sealing position and including a ring configured to be retained in the outwardly opening gland and formed with a distally and inwardly sloped first cam surface; and the sleeve device formed with a retainer flange incorporating a second cam surface to, when the sleeve device is moved proximally into its sealing position, engage the first cam surface to contract the retainer ring radially inwardly so the retainer flange clears the retainer ring to free the retainer ring to snap radially outwardly to engage the inwardly opening gland.

\* \* \* \* \*